United States Patent [19]

Ishiwatari et al.

[11] Patent Number: 4,965,035

[45] Date of Patent: Oct. 23, 1990

[54] METHOD OF PREFORMING A COVER MEMBER OF A CAN-SHAPED CONTAINER

[75] Inventors: Kiyokazu Ishiwatari; Yoshitsugu Hamada; Osamu Yamada, all of Kanagawa, Japan

[73] Assignee: Showa Denko Kabushiki Kaisha, Tokyo, Japan

[21] Appl. No.: 418,937

[22] Filed: Oct. 6, 1989

Related U.S. Application Data

[63] Continuation of Ser. No. 84,787, Aug. 13, 1987, abandoned.

[30] Foreign Application Priority Data

Aug. 13, 1986 [JP] Japan .................. 61-188694

[51] Int. Cl.⁵ .............................................. B29C 45/16
[52] U.S. Cl. .................................... 264/268; 264/250; 264/255; 264/269; 264/323
[58] Field of Search ............... 264/250, 255, 267, 268, 264/269, 292, 323

[56] References Cited

U.S. PATENT DOCUMENTS

| | | | |
|---|---|---|---|
| 2,425,390 | 8/1947 | Palmer et al. | 264/292 |
| 3,280,238 | 10/1966 | Calvert | 264/250 X |
| 3,597,298 | 8/1971 | Stengle, Jr. | 264/268 X |
| 4,225,553 | 9/1980 | Hirota et al. | 264/292 |
| 4,416,716 | 11/1983 | Ichikawa et al. | 264/268 X |
| 4,616,766 | 10/1986 | Miyauchi et al. | 220/450 |

FOREIGN PATENT DOCUMENTS

| | | |
|---|---|---|
| 0127159 | 12/1984 | European Pat. Off. |
| 56-126142 | 10/1981 | Japan . |
| 59-39535 | 3/1984 | Japan . |
| 61-35216 | 2/1986 | Japan . |

*Primary Examiner*—Jay H. Woo
*Assistant Examiner*—Jeremiah F. Durkin, II
*Attorney, Agent, or Firm*—Sughrue, Mion, Zinn Macpeak & Seas

[57] ABSTRACT

A method of preforming a cover for a can. The cover is formed from a planar base having a metallic barrier layer and resin layers on either side thereof. The base is first premolded to have a flat bottom recess, a cylindrical sidewall, and preferably an upper flap portion. In the premolding the base is stretched no more than by a factor of 1.8. Then a resin is injection molded over the premolded base to form either a uniform bottom cover or a top cover with a tab.

2 Claims, 10 Drawing Sheets

METHOD OF PREFORMING A COVER MEMBER OF A CAN-SHAPED CONTAINER

This is a Continuation of Application No. 07/084,787, filed Aug. 13, 1987 now abandoned.

BACKGROUND OF THE INVENTION

1. Field of the Invention

The present invention relates to a preforming method performed prior to simultaneous injection molding for forming a cover member made of synthetic resin. The cover is used for a can-shaped container such as a can for various beverage or canned food container or other similar containers.

2. Background of the Invention

One such can-shaped container of the type described above uses a synthetic resin as a main material, (see Japanese Laid-opened Patent Application Publication No. 52-39489).

The present inventor has been engaged in research on integral metal molding within a metal mold of an injection machine in an injection molding process. Instead of using a conventional adhesive agent procedure various techniques have been proposed, such as those disclosed in Japanese Patent Applications Nos. 58-90749, 58-124756, 59-146946, 59-146943, 59-146944, 59-248082 etc. In these techniques, an adhesive agent is applied to a provisionally injection-molded plastic sheet. A metal foil surrounded on both sides with plastic material layers provides a cover of a can-shaped container formed mainly of a plastic material.

The injection molding method will be described with reference to FIGS. 1–3 These processes have been described in commonly assigned U.S. patent application, Ser. No. 032,125, filed Mar. 30, 1987, now U.S. Pat. No. 4784284 incorporated herein by reference. This reference also discloses but does not claim many of the significant steps of the present invention. As shown in FIG. 1, a base (insert member) 40 having plastic material layer on both its sides or possibly only on one side is moved by a suction plate 41 connected to a movable cylinder 42 of a robot. The insert member 40 is inserted into a guide member (stripper plate) 43. As shown in FIG. 2, the insert member 40 is fixedly secured in the stripper plate 43 which thus prevents positional displacement of the insert member 40. Then, as shown in FIG. 3, the member is subjected to clamp-shaping.

By this clamping operation as shown in FIG. 3, the plate-like (two-dimensional shape) insert member 40 is bent at its peripheral end portion within a metal mold (core type receptacle) 44. Thereafter, molten resin is injected into a mold cavity (mold space) 48 defined between the core mold 44 and a cavity mold 47. The molten resin is injected through a gate 46 of the metal mold (cavity mold, injection mold) having also a resin in flow passage 45, so that can-shaped container cover is obtained.

The above-mentioned simultaneous molding (integral molding) process has the following advantages. (1) The number of production steps is reduced. (2) Peeling during retorting treatment of the food product contained in the can can be avoided because of high bonding strength in the molded product. (3) The resultant product has high resistance to damage if it is dropped (4) Good food sanitation properties is obtainable. Thus, an excellent can-shaped container cover is provided.

Incidentally, in case the flat insert member 40 is clamped and is subjected to bending treatment to obtain the three dimensional configuration as shown in FIG. 3, the insert member 40 may become deformed. The deformation or shearing is primarily in the form of wrinkles. Therefore, irregular and large wrinkles are generated if the insert member 40 is installed into the metal mold while maintaining the flat shape of the insert member 40. This problem may be overcome to some extent by using a relatively large insert member. However, in so doing, another problem may be raised in that the insert member may be sandwiched at the parting line of the confronting molds.

If injection molding is carried out against the insert member having deformation, the resultant molded product may be degraded due to non-uniform deformation.

As will be explained later, FIG. 4 shows a bottom view showing one example of can-shaped container cover (bottom cover) produced by the injection molding described above. In FIG. 4, injected resin may flow along a side wall 23 formed in the insert member 40 so that injected resin 17D adheres to the side wall 23. This resin adhesion is particularly significant at wrinkle generating portions 24 shown in FIG. 4A.

The bottom cover has a flap portion and the side wall. A barrel portion of the can-shaped container is fitted between the flap and the side wall. Further, an upper cover is attached to the can barrel to thereby form the can-shaped container. The upper cover has a construction similar to the lower cover and is produced by the injection molding. The flap portion in the cover is formed of the injected resin. The can barrel has its surface formed with heat-fusible resin layer.

These covers are generally attached to the can barrel by melting the resin through high frequency induction heating. In the heating process, the Al foil of the insert member is heated and the resin layer of the insert member is melted by the heat conduction, thus allowing it to fuse bond with the can barrel.

As described above, if the resin adheres over the side peripheral surface of the bottom cover due to resin outflow, (the same is true with respect to the upper cover), a larger heat amount is required for heating the Al foil and for melting the resin at the side wall. Therefore, the heat generating state may become irregular during high frequency induction heating. As a result, there results non-uniform sealing for attaching the cover to the can barrel. Also, the Al foil may be cut due to undue local heating. Further, leakage of content in the can barrel may occur.

SUMMARY OF THE INVENTION

It is therefore an object of the present invention to overcome the above-mentioned drawbacks of the prior art, and to provide an improved can-shaped container lid. More particularly, it is an object of the invention to eliminate resin outflow, to avoid seaming trouble at high frequency induction heating to ensure sufficient seaming, to provide good food sanitation properties, and to provide desirable injection moldability.

Other objects and novel characteristics of the invention will be clarified by the entire description of the specification and by attached drawings.

The present invention can be summarized as a method of preforming a cover member of a can-shaped container which includes the following steps preforming performed prior to obtaining a gas barrier type cover for the can shaped container. The cover is formed of synthetic resin which is produced by the steps of placing into an injection metal mold a barrier type base (multi-layer base) which is oxygen and vapor impermeable having heat-fusible and bondable resin layer on one or both sides, and injecting thermoplastic or thermosetting resin compound onto the multi-layer base. The preforming steps include mounting the multi-layer base of a plate-like shape onto an upper portion of a preforming metal mold (female metal mold) formed with a cylindrical recess. The plate-like multi-layer base has a diameter larger than the diameter of the cylindrical recess. An outer peripheral end portion of the multi-layer base is pressed toward an outer portion of the recess of the female metal mold so as to avoid substantial stretching of the base during slipping movement thereof into the recess of the female metal mold. The slippage is performed at a later stage. Another preforming metal mold (male metal mold) is mounted onto the multi-layer base. The male metal mold is of cylindrical shape and has a diameter smaller than that of the recess of the female metal mold. Then the multi-layer base is slippingly moved into the recess of the female metal mold by urging the male metal mold, so that there is obtained a preformed cover member in a three dimensional configuration and having a flap portion corresponding to the injection metal mold cavity. These steps eliminate substantial stretching of the multi-layer base.

BRIEF DESCRIPTION OF THE DRAWINGS

FIG. 8-10 are explanatory illustrations showing a process for making the cover of the can-shaped container according to the present invention, in which
FIG. 8 shows the state prior to clamping,
FIG. 9 shows the state during clamping,
and FIG. 10 shows a cross-sectional view of the molded product.

DETAILED DESCRIPTION OF THE PREFERRED EMBODIMENTS

One embodiment of a method according to the invention will be explained with reference to drawings.

Figure 5:
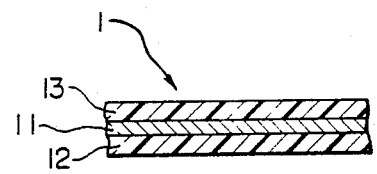
FIG. 5 is a cross-sectional view showing one example of a multi-layer base used in the present invention.

A multi-layer base 1 having a cross-section shown in FIG. 5 is punched out to obtain a predetermined circular shape. The multi-layer base 1 has an intermediate barrier layer 11 (such as aluminum) surrounded by two resin layers 12 and 13. The multi-layer base 1 is mounted on a female metal mold 4 shown in FIG. 6 which has a cylindrical hollow portion (recessed portion) 2 whose inner surface 3 is smoothly formed. The multi-layer base 1 has a diameter larger than that of the recess 2 of the female metal mold 4.

The outer peripheral end portion of the multi-layer base 1 thus mounted on the female metal mold 4 is pushed toward the outer annular portion of the recess 2 by means of a jig (not shown).

Figure 6:
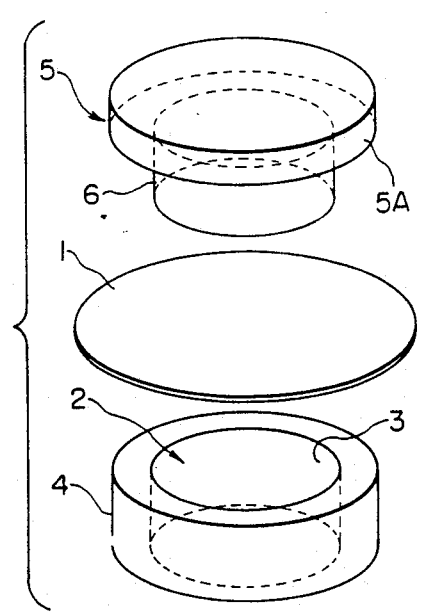
FIG. 6 is an explanatory illustration showing a performing process according to the present invention.

Next, a cylindrical male metal mold 5 shown in FIG. 6 which is provided with a flanged flat plate 5A at its upper surface is moved to slide the multi-layer base 1 toward the recess 2. The diameter of a piston 6 of the male metal mold 5 is smaller than that of the recess 2 of the female metal mold 4. The outer circumferential side of the piston 6 has a smooth surface.

In pushing the outer peripheral end portion of the multi-layer base 1 toward the female mold 4, soft or moderate pressing is performed so as to not substantially stretch the multi-layer base, particularly the intermediate barrier material 11 during its sliding (sliding in) movement.

Figure 7:
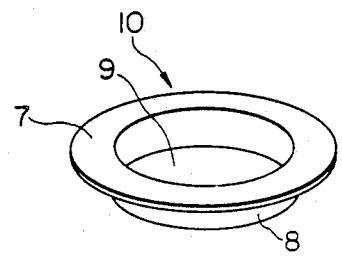
FIG. 7 is a perspective view of the preform member after preforming process.

With such preform molding, there is obtained a preformed multi-layer base (cover member) 10, shown in FIG. 7, having a container-like configuration with a flap portion 7, a barrel wall portion 8 and a bottom portion 9, which are all obtained without substantial stretching of the multi-layer base 1.

The flap portion 7 is formed by the flat plate 5A at an upper surface of the male metal mold 5.

Figure 6A:
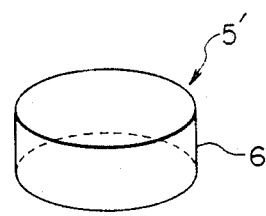
FIG. 6A is perspective view of an alternative die to be used with the preforming process of FIG. 6.

Alternatively, a male metal mold 5', illustrated in FIG. 6A, may be used which does not have the flat plate 5A. This produces a preformed cover member which lacks the flap portion 7.

The barrier material 11 which is one of the constituents of the multi-layer base 1 is formed of metal foil, shield film, etc.

A typical metal foil is aluminum foil (hereinafter simply referred to "alumi foil"). The present invention particularly relates to the can shaped container cover which includes the alumi foil as the gas barrier base. Other possible materials of the gas barrier base are saponification of ethylene vinylacetate copolymer, polyvinylidene chloride, polyamide, polyacrylonitrile, etc. those being in sheet or film form.

For the production of the container-shaped multi-layer base 10, it is possible to produce the container-like configuration shown in FIG. 7 by clamping the outer peripheral end portion of the multi-layer base 1 on a supporting table, and downwardly stretching the base 1 from its upper portion.

However, according to this method, the Al foil become non-uniform in thickness and pin hole and crack may be generated due to the stretching of the multi-layer film.

Figure 1:
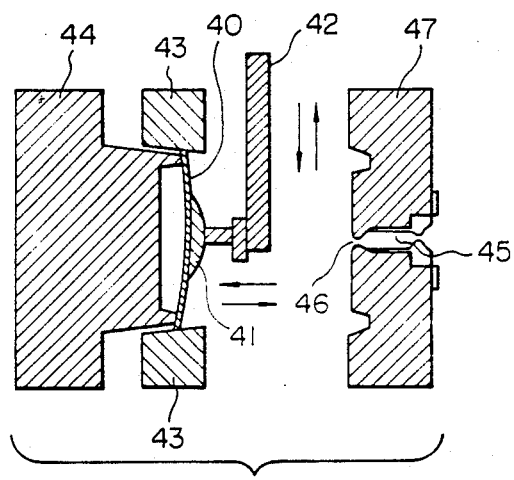
FIG. 1 shows an inserting step.
Figure 2:
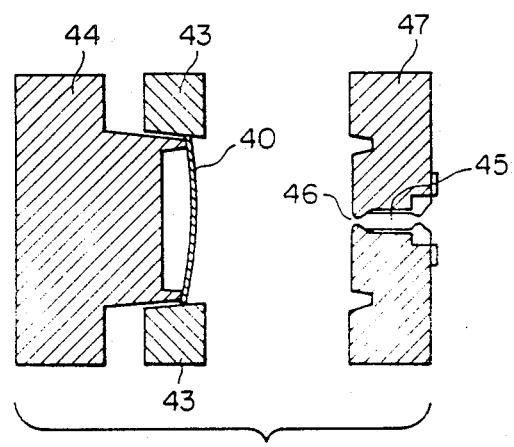
FIG. 2 shows the step prior to clamping.
Figure 3:
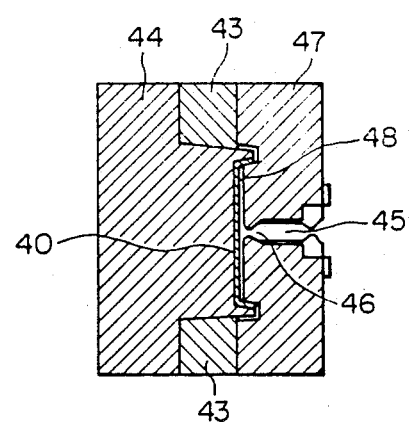
FIG. 3 shows the clamping step.

The present inventors has intended the provisional preform of the multi-layer base 1 as an attempt to eliminate generation of irregular and large wrinkles during the flat insert process shown in FIGS. 1-3, and to improve the seaming property in the production of the can-shaped container cover. Such wrinkles 24 are shown in FIG. 4A which arise from the process of FIGS. 1-3. However, if in a squeezing process a gas barrier base member is used which is formed of thin metal foil having a thickness of 7 to 60 micrometers, when stretching magnification would be 1.8 times or more, cracks are generated because the yield strength is exceeded. Therefore, it becomes apparent that such a method may lower the gas barrier characteristic required for the can-shaped container, and heat generation may be non-uniform during high frequency induction heating to cause difficulties in seaming. On the other hand, if the metal foil has a thickness of not less than 70 micrometers, production cost is greatly increased and new problems will arise at the upper opening portion of the upper cover of the can-shaped container, even though stretching magnification is enhanced.

According to the preforming method of the present invention, it would be possible to use the gas barrier base member (Al foil) having a thickness of about 7 to 60 micrometers. Further, uniform thickness is obtainable in the preform without substantial stretching, which is in contrast to the squeezing process. The stretching factor or magnification would be relatively low such as 1.0 to 1.8 times.

Because of the provision of the thin gas barrier base, the resultant can provide easy opening, and complete incineration results with relatively low incineration energy such as 5000 to 6000 kcal / kg to thereby minimize public pollution.

The multi-layer base 1 includes the thermally fusible resin layer (hereinafter referred to "primary resin layer") 12 and 13 at both or one side of the gas barrier base 11. The embodiment shown in FIG. 5 provides the primary resin layers at both sides of the gas barrier.

The can-shaped container cover of the according to the present invention is attached to the barrel portion of the can container as mentioned above. The barrel portion also includes the resin layer at its surface.

Provided that one of the primary resin layers positioned to be attached to the barrel is designated as an inner layer 12, the remaining primary resin layer 13 is subjected to thermal fuse bonding to a resin layer (herein after referred to secondary resin layer) which is laminated onto the preformed multiple layer base 10 by injection molding. This layer is designated as an outer layer 13. The multi-layer 1 should preferably have both inner and outer layers 12 and 13. Because of the provision of the outer layer 13, the highly sealable cover can be formed by thermal fusion to the secondary resin layer (injected resin layer). Nonetheless, the outer layer 13 can be eliminated.

The primary resin material is formed of a resin which is thermally fusible. A typical resin is thermoplastic resin. The inner and outer layers 12 and 13 can be the same material or different material from each other.

In order to form the primary resin layers 12 and 13 onto the gas barrier base 11, an adhesive resin layer such as adhesive agent or film-like hot melt adhesives may be interposed between the primary 12 or 13 and the barrier layer. This adhesive resin layer, of course, is of negligible thickness.

The primary resin layer has a preferable thickness of 100 micrometers or less per one layer.

The can-shaped container cover 10 is preformed to have a three dimensional configuration shown in FIG. 7 from the multi-layer base 1 having a two dimensional (flat) configuration.

Incidentally, in the preforming process, it is also possible to use mechanical or hydrauic press means for sliding the multi-layer base 1 punched in circular shape shown in FIG. 6 along the preforming mold 4.

Next, the process of injection molding will be described.

Figure 8:
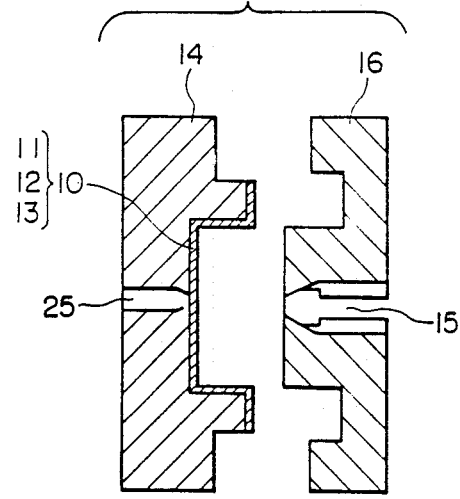
Figure 9:
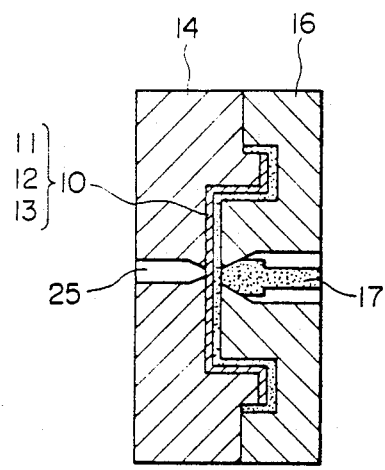
Figure 10:
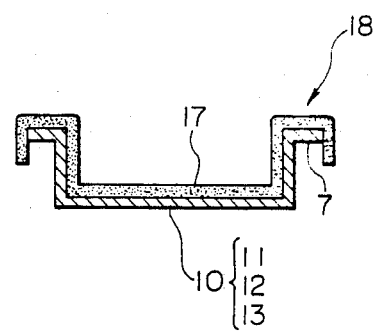

As shown in FIG. 8, the preformed cover member 10 is secured to the female metal mold 14 of the injection metal mold. The cover member 10 is clamped by a metal mold 16 having a gate 15 as shown in FIG. 8. By the injection of an injection molding material 17 through the base 15 of the metal mold 16 as shown in FIG. 9, the injection molding material 17 is fuse bonded to the cover member surface in confrontation therewith, so that a can-shaped container cover 18 having a cross-section shown in FIG. 10 is formed.

Figure 11:
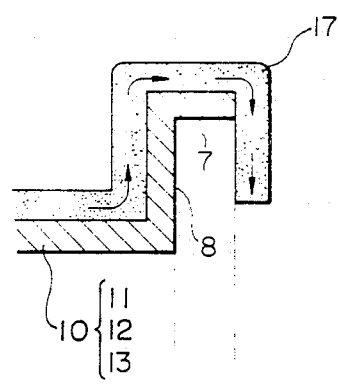
FIG. 11 is a cross-sectional view showing an essential portion of the cover member of the present invention.

As described above, because preforming the cover 1 provides the flap portion 7, the injected resin material strikes the wall face of the metal mold 16 (see FIG. 11), and almost all the injected resin material 17 advances in a direction parallel with the barrel wall portion 8 of the lid member 10, so a cover is provided which is capable of avoiding resin outflow.

Figure 12:
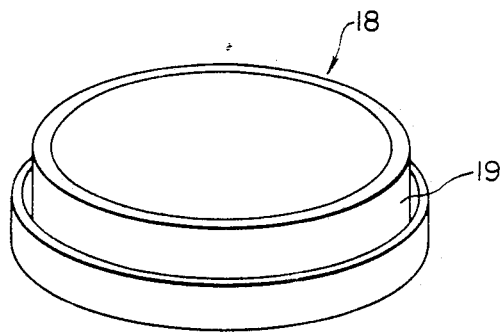
FIG. 12 is a bottom view of the cover member.

FIG. 12 is a bottom view of the cover 18 in which no resin outflow occurs, so that no resin is adhered to a bottom side face 19.

Figure 13:
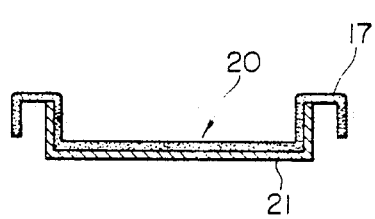
FIG. 13 is a cross-sectional view showing an alternative cover member of the invention.
Figure 14:
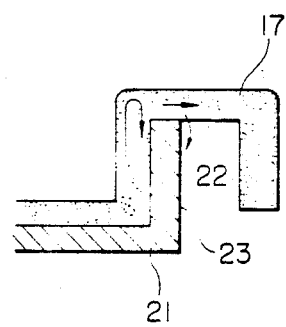
FIG. 14 is a cross-sectional view showing an essential portion of FIG. 13.

On the other hand, FIG. 13 is a cross-sectional view of a can-shaped container cover 20 which is formed by the flat-insert molding method shown in FIGS. 1-3, in which provisional preforming is not performed. As best shown in FIG. 14, no flap portion is provided on the multi-layer base 21 so that resin material 17 injected by the above described method flow along the side wall 23 as shown by an arrow 22, whereby the injected material 17 adheres to the side wall 23.

Figure 4:
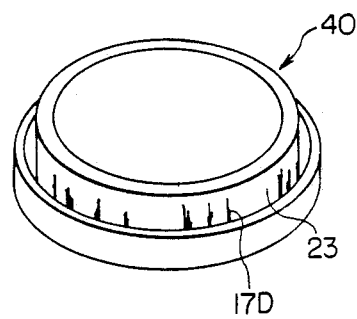
FIG. 4 is a bottom view of the conventional multi-layer base.
Figure 4A:
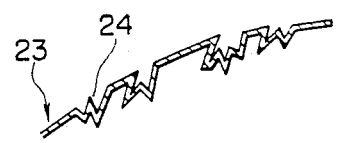
FIG. 4A is a cross-sectional view showing the generation of wrinkles in a conventional multi-layer base.

In such flat insert molding, irregular and large wrinkles are generated at the multi-layer base 21 during clamping, and resin outflow occurs at the wrinkle portion 17D of FIG. 4.

FIG. 4 is a bottom view showing the can-shaped container cover produced by such flat insert molding. Injected resin material 17D may be adhered to the side wall 23 due to resin outflow. The same is true with respect to the upper cover.

Further, in the flat-insert molding, the insert member 40 is fixed to the stripper plate 43 for the insert molding, spring-back may occur with respect to the insert member. Therefore, provisional preforming can obviate the spring back, and can improve shape retainability, so that the provisionally preformed member can provide sufficient mounting to the injection metal mold.

In the present invention, in order to further improve the retainability of the preformed member into the metal mold, vacuum sucking from one of the metal molds is particularly available as shown in FIGS. 8 and 9 through a vacuum passage 25. The preform also shows improved retention by use of the vacuum.

Figure 15:
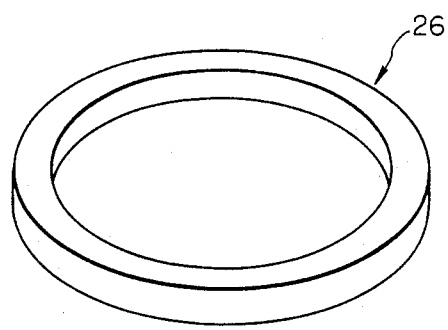
FIG. 15 is a perspective view of a lower cover.

Next, FIG. 15 is a perspective view showing the can-shaped container cover shown in FIG. 12. This cover is used as a bottom cover 26 attached to the container barrel similar to the upper cover.

Figure 16:
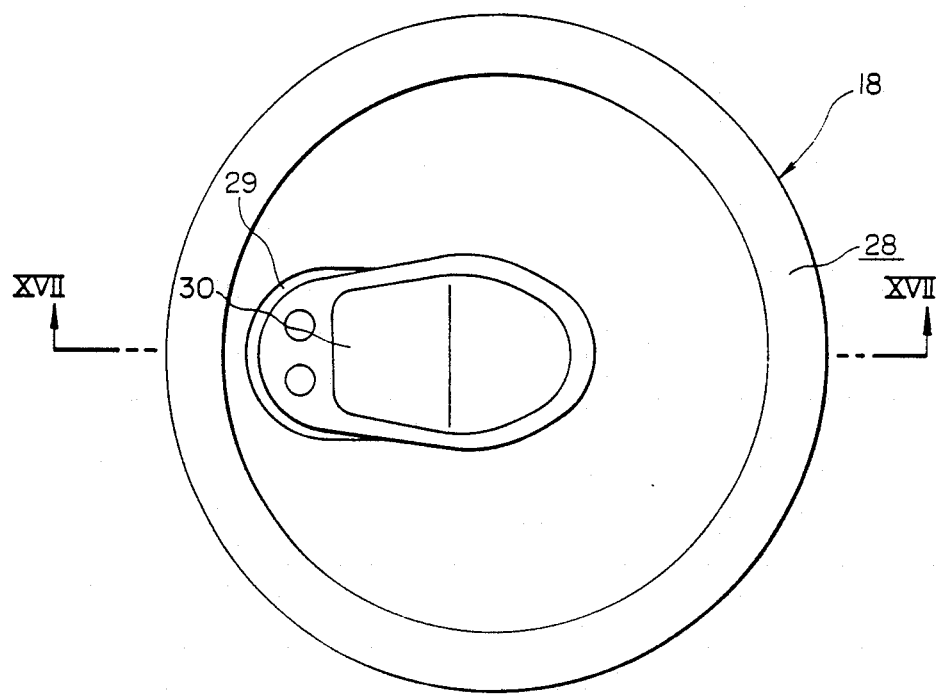
FIG. 16 is a plan view showing one example of a cover according to the present invention.
Figure 17:
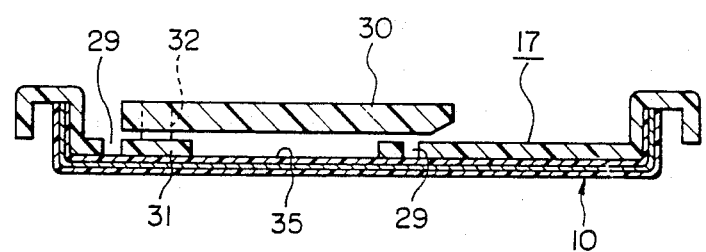
FIG. 17 is a cross-sectional view taken along the line XVII—XVII of FIG. 16.
Figure 18:
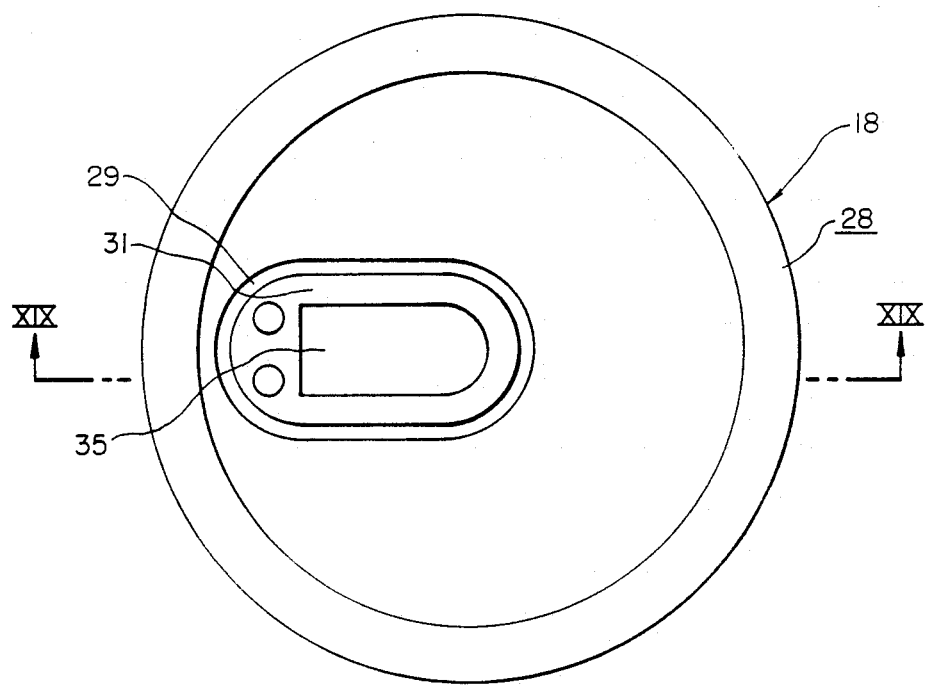
FIG. 18 is a plan view in which a rib of the cover shown in FIG. 16 is removed.
Figure 19:
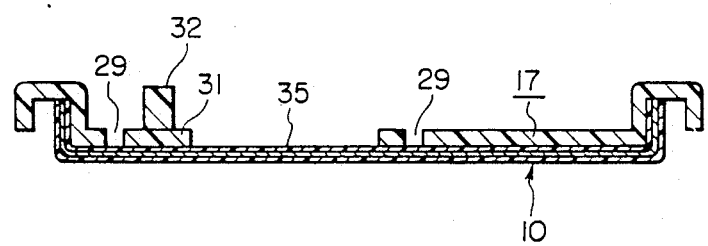
FIG. 19 is a cross-sectional view taken along the line XIX—XIX of FIG. 18.

FIG. 16 is a plan view of the upper cover, FIG. 17 is a cross-sectional view taken along the line XVII—XVII of FIG. 16, FIG. 18 is a plan view of a structure eliminating a rib for opening the cover, and FIG. 19 is a cross-sectional view taken along the line XIX—XIX of FIG. 19. The upper cover 18 includes the multi-layer base 10 and injected resin 17 laminated thereon. A main body 28 of the upper cover 18 at a position inside a flange portion 27 of the cover 28 is formed with a notch portion 29 at which the multi-layer base 10 is exposed. The notched portion 29 is in elliptical shape as shown. Some kind of curved configuration such as circular shape is preferable for the notch.

The upper cover 18 is opened along the notched portion 29

A rib attaching portion 31 is provided for attaching a rib 30 at a position inside the notched portion 29. For example, a boss 32 is provided on the end portion of the rib attaching portion 31 as shown in FIG. 16.

Figure 20:
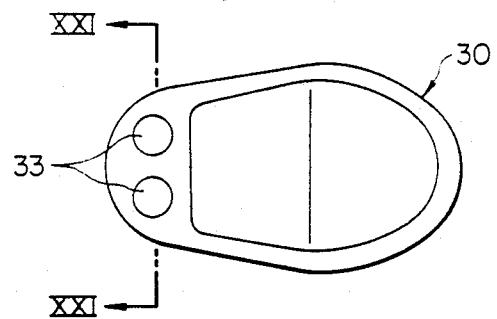
FIG. 20 is as plan view showing the rib.

FIG. 20 is a plan view showing one example of the rib 30. Holes 33 are formed at the other end portion of the rib 30.

Figure 21:
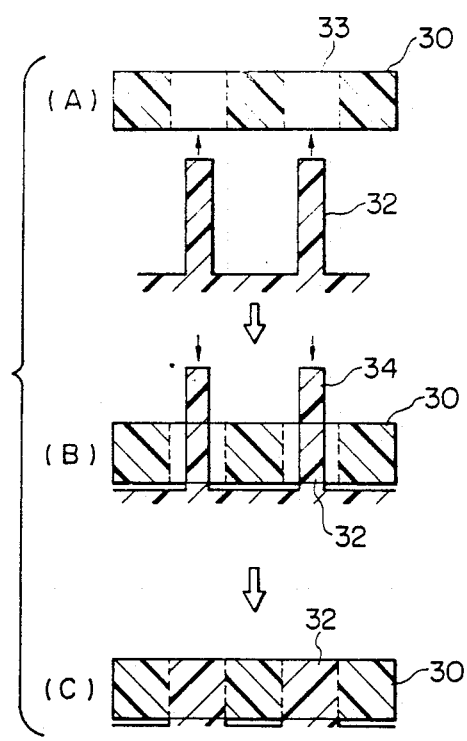
FIGS. 21 and 22 are cross-sectional view showing rib attachment and taken along the line XXI—XXI of FIG. 20.
Figure 22:
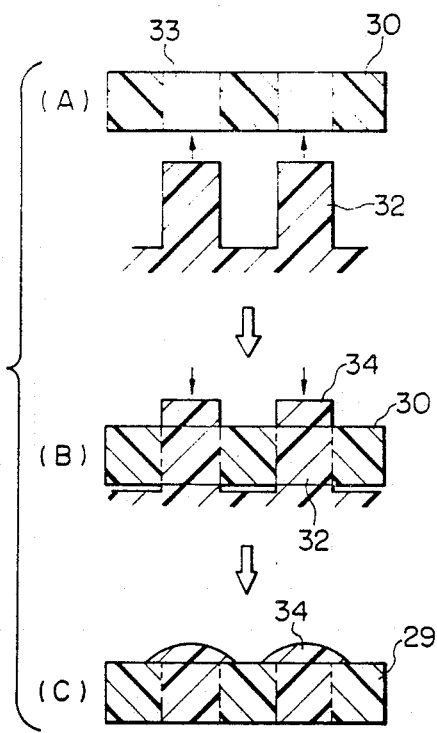

FIG. 21 and FIG. 22 are explanatory diagrams, along the section XXI—XXI of FIG. 20 showing the attachment of the rib 30 to the boss 32. The rib 30 is attached to the boss 32 utilizing the holes 33. In FIG. 22, a head portion 34 of the boss 32 projecting from the hole 23 is fuse-bonded by the high frequency heating so that the rib 30 is attached to the rib attaching portion 31. However, in this case, the head portion 34 of the boss 32 bulges over the hole 33 of the rib 30 to degrade the external appearance. Therefore, as shown in FIG. 21, it is preferable to provide a flush relationship between the upper surface of the rib and the upper surface of the boss 32 by controlling the inner diameter of the hole of the rib 30 and the outer diameter of the boss 32 so that the head portion 34 of the boss 32 fills into a space of the hole 33 of the rib 30.

As shown in FIG. 18, the upper cover 18 includes a multi-layer base exposing portion 35 and the notched portion 29 at the inside of the attaching portion 31 for attaching the rib 30.

Next, another example of can-shaped container cover will be described.

Figure 23:
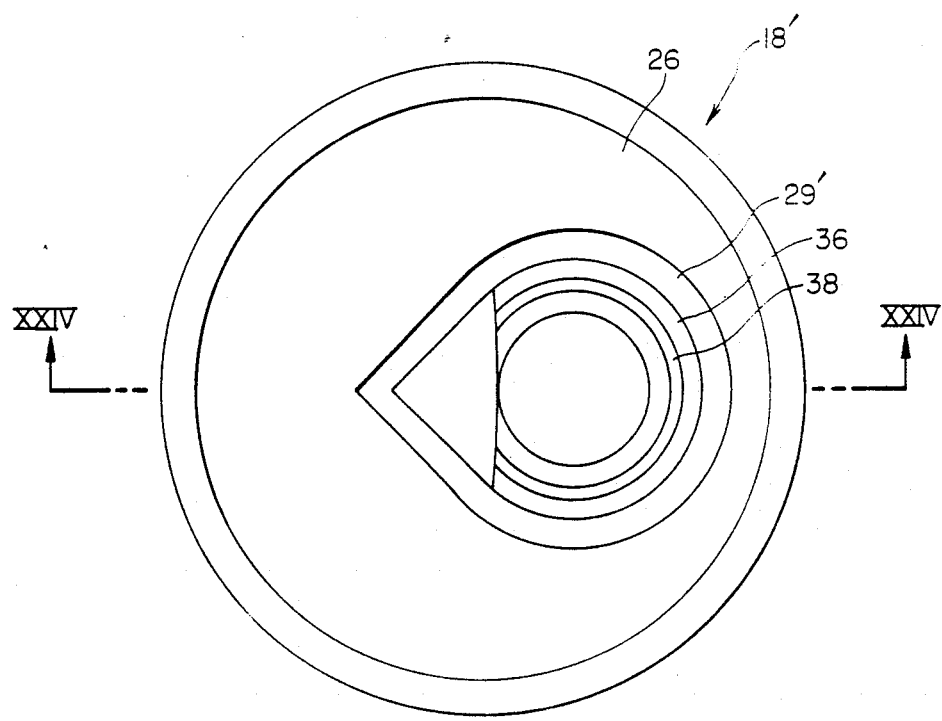
FIG. 23 is a plan view showing another example of a cover according to the present invention.
Figure 24:
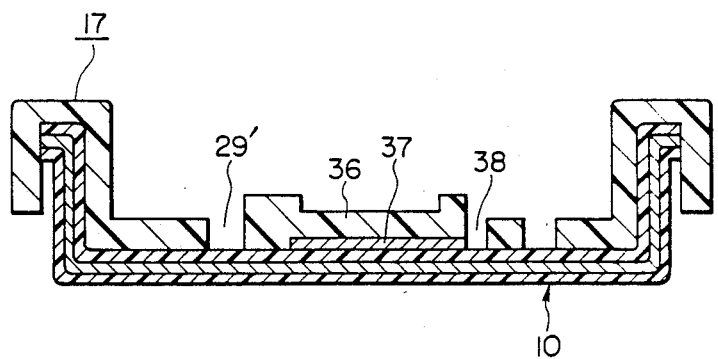
FIG. 24 is a cross-sectional view taken along the line XXIV—XXIV of FIG. 23.

FIG. 23 is a plan view showing another example of the upper cover, and FIG. 24 is a cross-sectional view taken along the line XXIV—XXIV of FIG. 23. The present invention is also applicable to the cover 18 shown in these Figures.

An upper cover 18' includes a rib 36 formed of injected resin which is laminated onto the multi-layer base 10 through a print ink layer 37. This structure is different from the previously described embodiment. That is, in the upper cover 18', injected resin 17 is laminated by injection molding over the multi-layer base 1.

In the upper cover 18', a finger tip is inserted into a groove 38 to pull up the rib 36 so that the cover is opened along a notched portion 29'. In this instance, the multi-layer base 10 and the rib 36 formed from injected resin are firmly bonded together due to the above-mentioned injection molding, so that it becomes difficult to peel off the cover.

Therefore, a processing layer 37 such as above-described print ink layer is disposed between the multi-layer base 10 and the rib 36 for easy removal of the rib. However, such ink coating would be rather troublesome.

In this respect, as shown in the two embodiments of FIG. 16-19, the multi-layer exposing portion 35 may be formed without providing the processing layer 37, so that any additional treatment for the easy removal of the rib, such as by employing ink layer, can be eliminated. Further, the exposing portion 35 which allows the multi-layer base 10 to be exposed can enhance mechanical strength against dropping of the can container.

Next, an example for opening the cover 18 will be described with reference to FIGS. 16-19. If a portion of the rib 30 positioned opposite the rib attaching portion is pulled by a finger, the cover 18 is opened along the notch portion 29.

Figure 25:
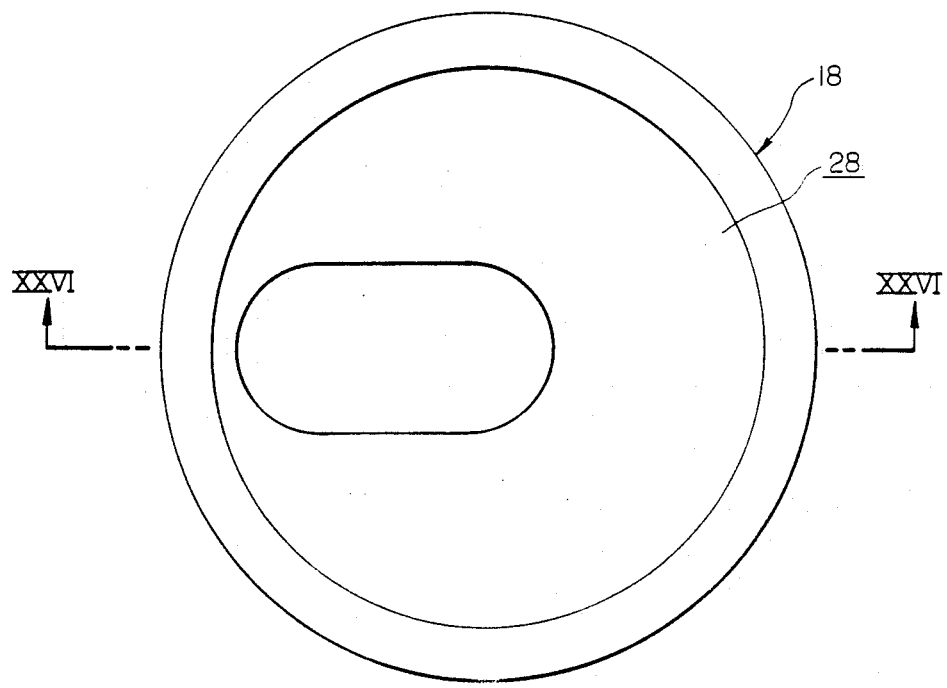
FIG. 25 is a plan view in which the cover is opened.
Figure 26:
FIG. 26 is a cross-sectional view taken along the line XXVI—XXVI of FIG. 25.

FIG. 25 is a plan view of the upper cover 18 after opening, and FIG. 26 is a cross-sectional elevation taken along the line XXVI—XXVI of FIG. 25. In these figures, the cover 18 is opened along the notch portion 29. It is apparent that the attaching portion 31, a portion of multi-layer base 10 positioned below the attaching portion 31, as well as the multi-layer base portion positioned inside the attaching portion 31 are also removed during the opening.

The attaching portion 31 is adapted to serve as an attachment to the rib 30. The attaching portion 31 also serves to lift the multi-layer base portion positioned therebelow and in contact therewith in response to the pulling of the rib 30 so that the multi-layer base portion can be cut for forming the opening.

Figure 27:
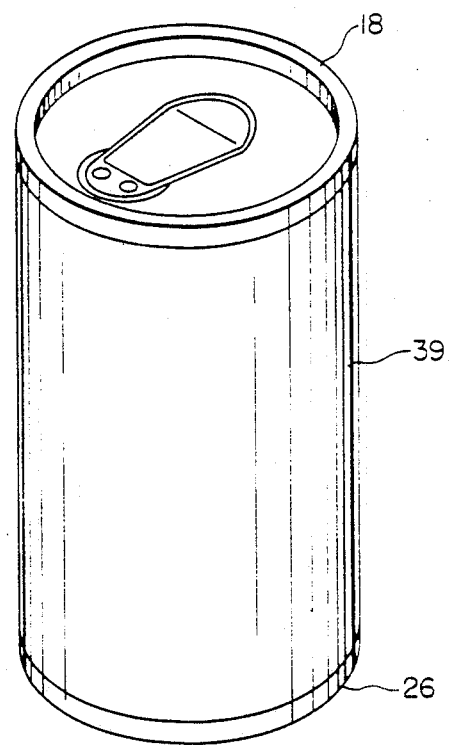
FIG. 27 is a perspective view showing one example of a can-shaped container.

The final container, illustrated in FIG. 27 consists of the upper cover 18, the lower cover 26 and a barrel 39. These components may be joined according to the process disclosed in the previously mentioned U.S. patent application, Serial No. 032,125.

As above-mentioned injected resin used in the invention, various resins can be employed but as the preferred one, there may be mentioned polyolefin-containing synthetic resins such as polypropylene, ethylene-propylene copolymers, and the like which have excellent heat resistance for a high temperature, for example, when the can-shaped container is retorted during processing of food contained therein.

Inorganic fillers may be mixed with these resins.

By mixing of inorganic fillers, the following advantages can be obtained.

(1) The dimensional stability of can-shaped containers is improved and their shrinkage factor is reduced.

(2) The heat resistance of the containers is improved and the thermal deformation temperature is raised, which is advantageous for retorting of the containers.

(3) The heat of combustion is reduced and the combustion furnace is not damaged when the container is incinerated within it, which is advantageous with respect to prevention of environmental pollution.

(4) The rigidity is increased, which is advantageous when the containers are distributed as goods.

(5) The heat conductivity is improved, which is advantageous in retorting of the containers.

(6) The cost can be reduced.

As the inorganic fillers for the injected resin, ones used generally and widely in the field of synthetic resins and of rubbers may be employed. As the inorganic fillers, the ones having good food sanitation properties and which do not react with oxygen and with water and are not decomposed when mixed with the resin or when the mixture with the resin is molded are preferably used. The above-mentioned inorganic fillers are broadly divided into compounds such as metallic oxides, hydrates (hydroxides), sulfates, carbonates, and silicates, double salts of these compounds, and mixtures of these compounds. As the representative example of the inorganic fillers, there may be mentioned aluminum oxide (alumina), its hydrate, calium hydroxide, magnesium oxide (magnesia), magnesium hydroxide, zinc oxide (zinc white), lead oxide such as minium and white lead, magnesium carbonate, calcium carbonate, basic magnesium carbonate, white carbon asbestos, mica, talc, glass fiber, glass powder, glass beads, clay, kieselguhr, silica, warringtonite, iron oxide, antimony oxide, titanium oxide (titania), lithopone, pumice powder, aluminum sulfate (gypsum or the like), zirconium silicate, zirconium oxide, barium carbonate, dolomite, molybdenum disulfide, and iron sand. Of powdered types of these inorganic fillers, the ones having a particle diameter of 20 micrometers or less (suitably 10 micrometers or less) are preferred.

As fibrous types of fillers, the ones having a fiber diameter of 1-500 micrometers (suitably 1-300 micrometers) and fiber length of 0.1-6 mm (suitably 0.1-5 mm) are preferred. Further, as plate-shaped types of fillers, the ones having a plate diameter of 30 micrometers or less (suitably 10 micrometers or less) are preferred. Of these inorganic fillers, plate-shaped (flaky) ones and powdered ones are, in particular, suitable.

Various additives such as pigments and the like may be added to a resin for injection molding.

According to the present invention, stabilized seaming working is attainable, since resin out flowing is prevented which causes troubles for seaming. Also prevented is the cut out of the gas barrier base to thereby provide uniform heating distribution along peripheral surface thereof during high frequency induction heating for attaching the cover to the can barrel.

According to the present invention, an excellent sanitation property is attainable because of the stabilized seaming, since there is no cut in the gas barrier base. Further, sanitation is also improved since the food contained in the can is not in contact with the outflowed resin because of prevention of the outflow. Particularly, the present invention is advantageous when mixing the pigment and filler with the injected resin.

According to the present invention, since the multi-layer base is provisionally preformed, it is stably mounted onto the injection metal mold. Therefore, material yieldability during injection molding process can been enhanced.

According to the present invention, a can shaped container is economically produced since thin metal foil is available because of the preforming at a low stretching factor. Further, the cover is easily opened for this reason.

According to the present invention, a can-shaped container is obtainable which provides excellent sealability and prolonged storage since the provisionally preformed member has the flap portion which can provide thermal fusion to the can barrel at the upper surface of the flange portion.

What is claimed is:

1. A method of forming a cover member, comprising the steps of:
   forming a plate-like base having a barrier layer and synthetic resin layer heat fused to at least one side of said barrier layer;
   mounting said base onto an upper portion of a first preforming metal mold formed with a cylindrical recess, said recess having a diameter smaller than a diameter of said base;
   pressing an outer peripheral end portion of said base toward an outer portion of said first metal mold;
   mounting a second preforming metal mold onto said base;
   urging said second metal mold into said recess of said first metal mold, so as to softly press said base with moderate force into said recess of said first metal mold, wherein when said second metal mold is urged into said recess, said base is held in a loose condition so that stretching of said base is substantially prevented, and thereby forming from said base a provisionally preformed cover member having a central disk-shaped lid portion, a barrel portion extending from a periphery of said lid portion perpendicular thereto, and a flap portion extending outward from an outer periphery of said barrel portion perpendicular to said barrel portion;
   placing said provisionally preformed cover member in an injection mold; and
   injecting one of a thermoplastic resin and a thermosetting resin compound onto said base in said injection mold such that said resin compound forms an inverted U-shaped portion which surrounds said barrel portion and said flap portion.

2. A forming method as recited in claim 1, wherein said urging step moves said base so that said base stretches with a stretching factor of no more than 1.8.

* * * * *